United States Patent
Bramani et al.

(10) Patent No.: US 10,188,170 B2
(45) Date of Patent: Jan. 29, 2019

(54) SIGNALING SOLE FOR SHOES, SHOE PROVIDED WITH SAID SOLE AND KIT COMPRISING AT LEAST ONE OF SAID SOLE

(71) Applicant: Vibram S.p.A., Albizzate (Varese) (IT)

(72) Inventors: Marco Bramani, Albizzate (IT);
Claudio Conchieri, Albizzate (IT);
Francesco Perrotti, Albizzate (IT)

(73) Assignee: VIBRAM S.P.A., Albizzate (Varese) (IT)

( * ) Notice: Subject to any disclaimer, the term of this patent is extended or adjusted under 35 U.S.C. 154(b) by 0 days.

(21) Appl. No.: 15/514,072

(22) PCT Filed: Jul. 30, 2015

(86) PCT No.: PCT/IB2015/055784
§ 371 (c)(1),
(2) Date: Mar. 24, 2017

(87) PCT Pub. No.: WO2016/046657
PCT Pub. Date: Mar. 31, 2016

(65) Prior Publication Data
US 2017/0290390 A1  Oct. 12, 2017

(30) Foreign Application Priority Data
Sep. 26, 2014 (IT) .............................. VR2014A0235

(51) Int. Cl.
*G08B 23/00* (2006.01)
*A43B 3/00* (2006.01)
(Continued)

(52) U.S. Cl.
CPC ............ *A43B 3/001* (2013.01); *A43B 3/0005* (2013.01); *A43B 7/1455* (2013.01); *A61H 3/061* (2013.01);
(Continued)

(58) Field of Classification Search
CPC .......... A43B 3/001; A43B 23/00; A43B 3/005
(Continued)

(56) References Cited

U.S. PATENT DOCUMENTS 5,771,611 A  *  6/1998  Chang .................. A43B 1/0036
                                                    36/137
7,832,124 B2 * 11/2010  Blockton ............. A43B 3/0005
                                                    36/136
(Continued)

FOREIGN PATENT DOCUMENTS

| CN | 103919664 | 7/2014 |
| JP | 20000004901 | 1/2000 |
| WO | 2008151642 | 12/2008 |

*Primary Examiner* — Toan N Pham
(74) *Attorney, Agent, or Firm* — Tutunjian & Bitetto, P.C.

(57) ABSTRACT

The present invention regards a sole for shoes including an upper surface, in use facing the user, a lower surface, in use facing the ground or the resting surface, and a thickness, wherein the thickness corresponds to a distance between the upper surface and the lower surface, wherein the sole includes at least one signaling means. Such at least one signaling means includes at least one vibrating motor, capable of vibrating inside such sole and/or at least one light device and the sole includes means for receiving-processing a control signal (sc) intended, in use, to receive and process such control signal (sc) and to emit in reply an activation-deactivation signal (S) towards such at least one signaling means.

27 Claims, 5 Drawing Sheets

(51) Int. Cl.
*A43B 7/14* (2006.01)
*G06F 3/01* (2006.01)
*A61H 3/06* (2006.01)
*B06B 1/02* (2006.01)
*F21V 8/00* (2006.01)
*G08B 5/36* (2006.01)
*H02K 7/06* (2006.01)

(52) U.S. Cl.
CPC .............. *B06B 1/02* (2013.01); *G02B 6/0005* (2013.01); *G06F 3/011* (2013.01); *G08B 5/36* (2013.01); *H02K 7/061* (2013.01)

(58) Field of Classification Search
USPC ............................................ 340/573.1; 36/73
See application file for complete search history.

(56) References Cited

U.S. PATENT DOCUMENTS

| | | | |
|---|---|---|---|
| 8,844,166 B2 * | 9/2014 | Jazdanian | A43B 3/0005 36/141 |
| 2011/0153197 A1 | 6/2011 | Song | |
| 2011/0242316 A1 | 10/2011 | Guerrero | |
| 2014/0266570 A1 | 9/2014 | Sharma et al. | |
| 2014/0266571 A1 | 9/2014 | Sharma et al. | |

* cited by examiner

SIGNALING SOLE FOR SHOES, SHOE PROVIDED WITH SAID SOLE AND KIT COMPRISING AT LEAST ONE OF SAID SOLE

TECHNICAL FIELD OF THE INVENTION

The present invention refers to a signaling sole for shoes and to a shoe provided with one such signaling sole. In particular, such signaling sole is provided with a signaling system capable of communicating, for example by means of Bluetooth or by means of any suitable wireless data transmission standard, with a portable device at a certain distance therefrom. The present invention also refers to a kit comprising at least one such signaling sole as well as to a method for controlling at least one sole of such kit.

STATE OF THE PRIOR ART

Currently, soles or shoes are known which are able to communicate with a portable device of a user. Such soles or shoes have vibrating means which, based on the indications provided by a navigation system, installed on such portable device, vibrate based on the direction that user must follow, until he/she reaches a destination preset on the navigation system.

For example, the document US 2011/0153197 describes a navigation apparatus in shoe sole form that indicates to a user the direction to be followed, by communicating with a remote navigation device, which comprises a guide/orientation service. Such sole comprises a GPS module which provides information on the position of the user who wears such sole to the navigation device, and controls a plurality of vibrating means, which indicate to the user himself/herself the direction to be followed through a vibration. The vibrating means are positioned in four areas of the sole and, in particular, at the four directions that the user could or should travel, i.e. on a front area or toe, on a rear area or heel, on the right side and on the left side respectively for the direction of stopping, advancing, moving back, turning right and turning left. The users of one such sole type could for example be elderly or blind. One drawback of such sole type is that it is very difficult to distinguish—from the signal perceived on the sole of the foot of the user who wears a shoe provided with the present sole—the four areas corresponding to the various directions to be travelled. Therefore, it is not easy to use such shoes or soles, since much attention must be given with regard to the exact zone of the sole/of the foot where the vibrating means vibrate, in order to understand the exact direction to be followed.

In addition, in case of use in outdoor or crowded places, the vibrations of the shoe can be confused with the background noise of the environment, for example with the vibrations deriving from traffic, or from transport means, or from road work underway on the path that the user is following, thus very much complicating the distinction of the vibrations emitted by the sole and hence the identification of the path to be followed.

There is therefore the need for a type of shoes or signaling soles which overcome the aforesaid drawbacks and which allow clearly perceiving the signal transmitted to the user, reducing the risk of errors to the minimum.

SUMMARY OF THE INVENTION

One object of the present invention is to improve the state of the prior art.

A further object of the present invention is to propose a sole for shoes provided with a signaling device for the user who wears it.

Another object of the present invention is to propose a sole for shoes provided with a signaling device, capable of clearly signaling specific events to the user. A further object of the present invention is to propose a sole for shoes comprising a signaling device capable of communicating with a portable device.

Another object of the present invention is to provide a kit comprising at least one sole, provided with a signaling device.

Still another object of the present invention is to provide a method for controlling at least one sole of the above kit.

Not least object of the present invention is to provide a method for controlling at least one sole of the kit which is easy to implement, easily comprehensible by a user who wears one such sole and which facilitates the street navigation of the user.

In accordance with one aspect of the present invention, a sole is provided for shoes according to the present specification.

According to a further aspect of the present invention, a kit is provided comprising at least one sole for shoes according to the present specification.

According to a third aspect of the present invention, a method is provided for controlling at least one sole of the kit according to the present specification.

In addition, the present invention refers to a shoe provided with a signaling sole, provided with the advantages conferred by the sole itself.

BRIEF DESCRIPTION OF THE DRAWINGS

Further characteristics and advantages of the present invention will be clearer from the detailed description of a preferred but not exclusive embodiment of a signaling sole for shoes, illustrated as a non-limiting example in the enclosed drawing tables in which.

DETAILED DESCRIPTION

Figure 1:
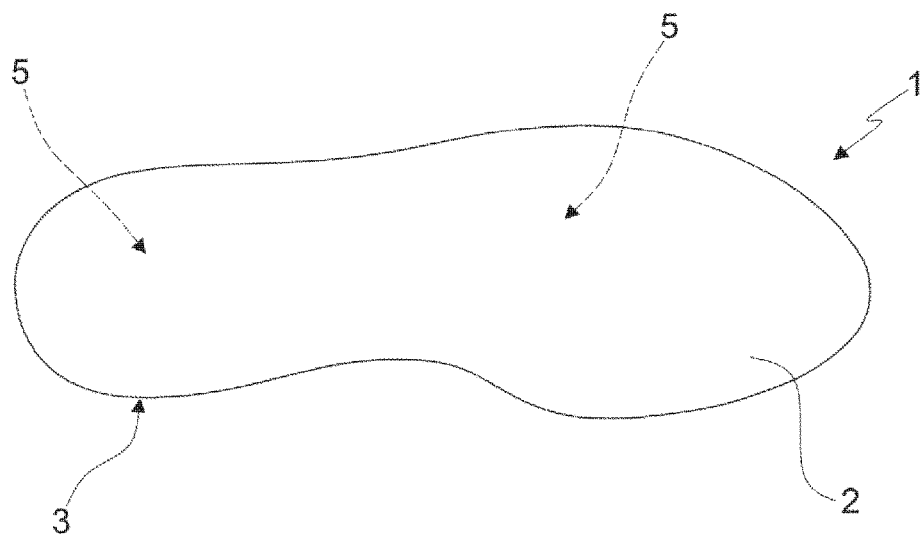
FIG. 1 is a plan view of the signaling sole according to the present invention.
Figure 2:
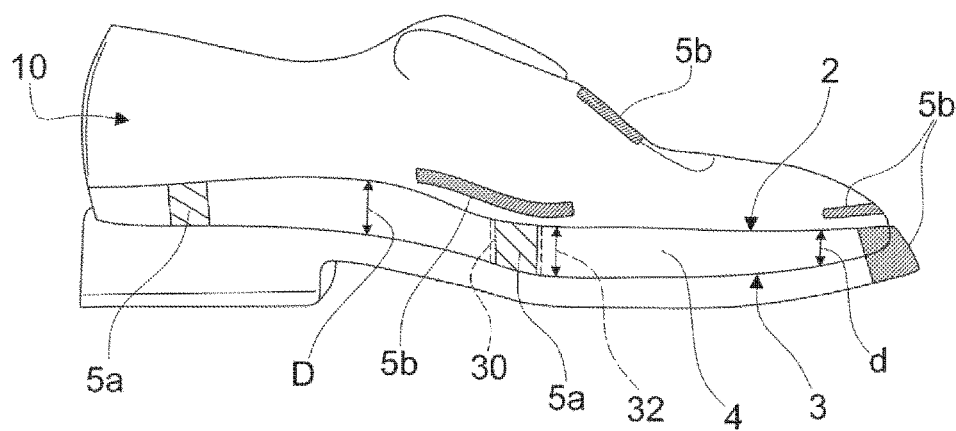
FIG. 2 is a side view of a shoe provided with a signaling sole according to FIG. 1.

With reference to the present invention and to the enclosed figures, reference number 1 overall indicates a signaling sole for shoes.

Such sole 1 has an upper surface 2, in use facing the user, and a lower surface 3, in use facing the ground.

The sole 1 has a thickness 4, intended as the distance between the upper surface 2 and the lower surface 3 of the sole itself, which can be variable.

If it is variable, the thickness 4 at the arch of the foot or in the area of the heel can have a first height D greater than a second height d of the thickness 4 of the sole 1, for example at the toe or external side of the foot itself.

In such a manner, the thickness 4 of the sole 1 corresponds with the anatomy of the foot and ensure an optimal resting of the sole of the user's foot on the ground or on the resting surface.

In addition, the thickness 4 of the sole 1, as will be clarified herein below, has a size adapted for containing the various components present in the signaling sole 1.

The sole 1 according to the present invention can act as a sole of a shoe, integrated therefore with an upper 10, and possibly comprise a covering insole 20 (visible for example in FIGS. 7 and 8), internal during use and adapted to come into contact with the foot of the user.

The insole 20 can be made of fabric, or non-woven fabric, or of leather, or of synthetic material, or of breathable material, or of any material adapted to come into contact with the foot of the user.

The present invention in fact also refers to a shoe provided with a signaling sole 1 according to the present invention.

Alternatively the signaling sole 1 can act as an insole insertable in a shoe of known type. In such case, the upper surface 2 of the sole 1 can itself be adapted to come into contact with the foot of the user, or it can be covered or integrated with a covering insole 20.

The sole 1, within its thickness 4, comprises at least one signaling means 5.

The at least one signaling means 5 comprises, in one version of the invention, at least one suitable vibrating motor 5a that is preferably but not limited to the type normally used for generating a vibration in cell phones. Such vibrating motor 5a is preferably housed in the thickness 4 of the sole 1 and capable of transmitting the generated vibrations to the interior of the sole 1. In particular, the vibration produced by the least one vibrating motor 5a is capable of affecting a large part of the sole 1, in a manner such that the user who wears the sole 1 or a shoe provided with one such sole 1 can sense such vibration in a clear and safe manner roughly along the entire sole of the foot.

Figure 3:
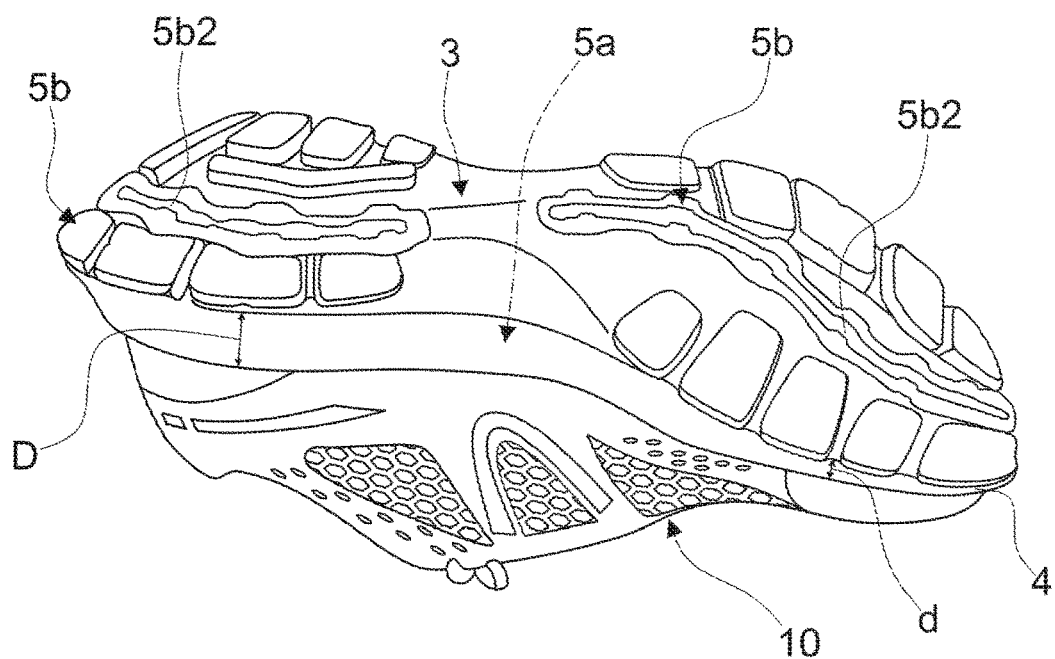
FIG. 3 is a bottom perspective view of a shoe provided with a signaling sole according to one version of the present invention.
Figure 4:
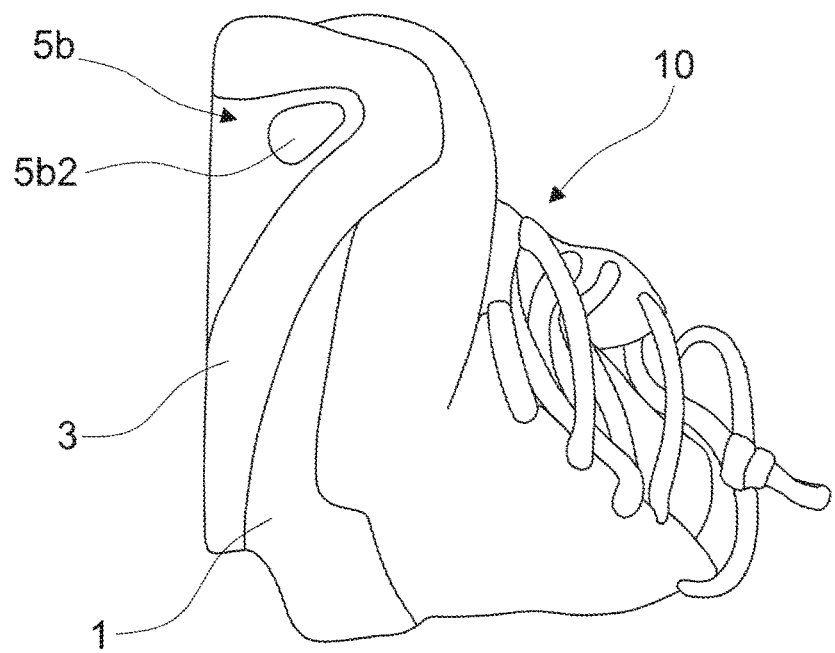
FIG. 4 is a front perspective view of the shoe of FIG. 3.
Figure 5:
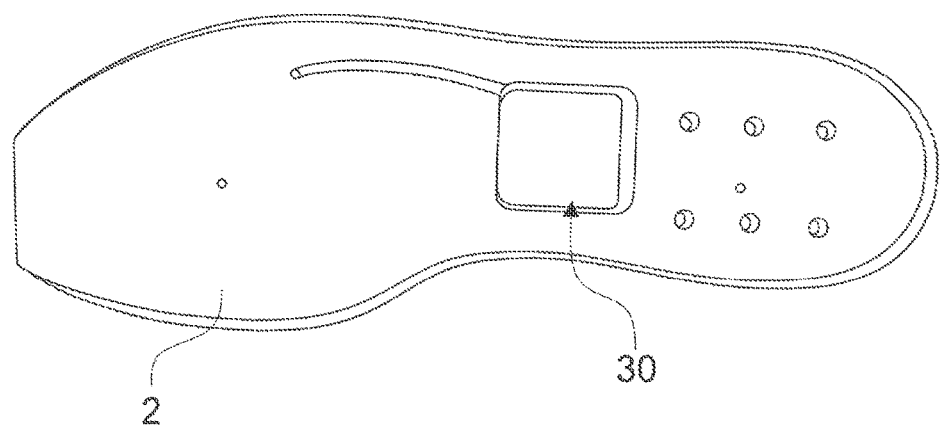
FIG. 5 is a plan view of a sole according to the present invention.
Figure 6:
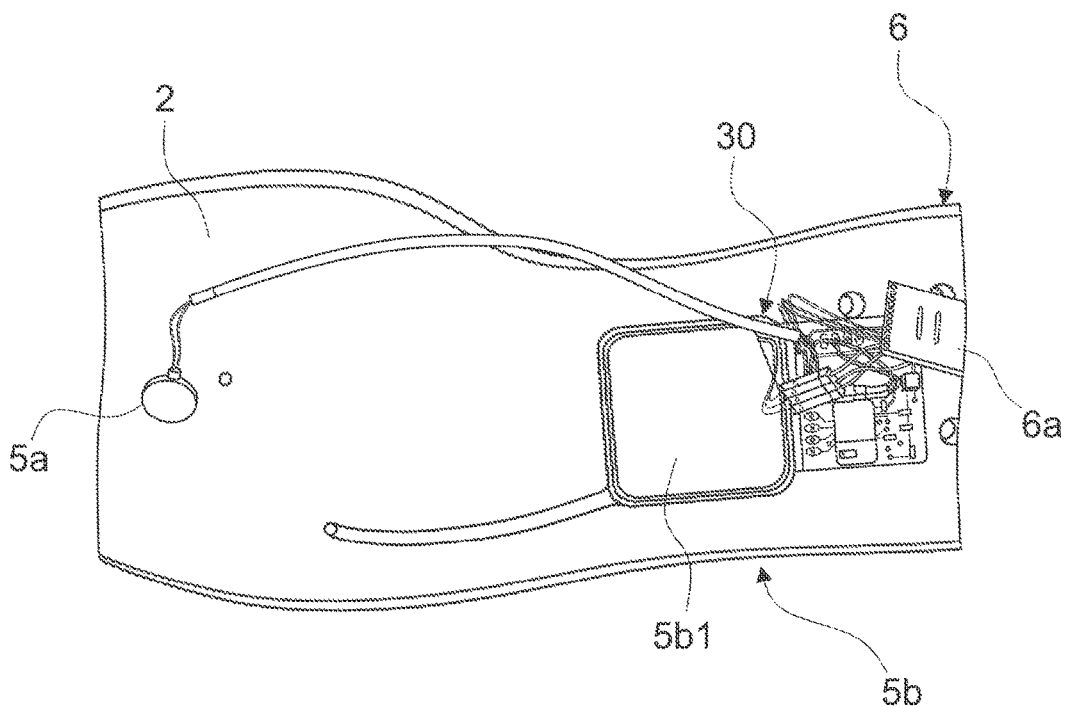
FIG. 6 is a plan view of a version of the sole according to the present invention, provided with several components for controlling the sole itself.

The at least one signaling means 5 of the sole 1 can comprise, as an alternative and/or in addition to the at least one vibrating motor 5a, at least one light device 5b, preferably housed in the thickness of the sole, and capable of emitting a light radiation at zones easily visible for the user, such as for example at the front end or tip of the sole 1 and/or of the lower surface 3 of the sole itself (as is clear, for example, in FIGS. 3 and 4). One such light means 5b comprises, for example, at least one light source 5b1, and possibly at least one means 5b2 for propagating a light radiation that can be generated by such light source. Preferably, the light source 5b1 comprises one or more LEDs or laser sources, each LED or laser source being able to emit light of different color from the others and arranged in the sole, for example, at its lower surface 3 in a roughly central zone of the sole.

The propagation means 5b2 comprises one or more optical fibers, also arranged at the lower surface 3 of the sole 1 (FIGS. 3 and 4) and/or at the side of the sole itself, such that a light radiation transmitted therein is externally visible. If the sole is integrated in a shoe, as mentioned above, the propagation means can be applied—either in addition or as an alternative—to the upper 10 of the shoe provided with the sole 1. In this case, the at least one light device 5b, in particular the propagation means 5b2, can be provided included, in any one suitable manner, in the upper of the shoe at the points more clearly visible for the user, for example at the toe or in the front portion during use or in the external and/or internal side of the upper itself.

The signaling sole 1 according to the present invention also comprises receiving-processing means 6, in practice a suitably designed chip-integrated system, intended to receive and process a control signal sc emitted by a portable device placed at a certain distance from the sole 1, which will be better described herein below, and to send suitable control signals to such device. The receiving-processing means 6 of the sole 1 according to the present invention, once the signal sc has been received and processed, are in use set to emit an activation-deactivation signal S in reply for at least one signaling means 5, i.e. for at least one vibrating means 5a and/or one light device 5b.

The sole 1 according to the present invention also comprises, housed therein, power supply means 50 for the at least one signaling means, e.g. one or more batteries, rechargeable or otherwise, of any one suitable type, e.g. lithium batteries, preferably removable from the sole 1 once used.

Alternatively, if the power supply means 50 are of rechargeable but not extractable type, the sole 1 can comprise input-output means (e.g. a micro-USB port, not illustrated in the drawings) adapted to connect such rechargeable batteries to a suitable charger means (the power network or any one other charger device).

As will be observed, in the sole 1 according to the present invention, at least one hollow seat 30 is obtained, open towards the upper surface 2 of the sole 1 and extended for a depth 32, within the thickness 4 of the sole 1. The depth 32 of the hollow seat 30 is less than or equal to the thickness 4 of the sole itself. Such at least one seat 30 is adapted to contain the at least one signaling means 5, possible cables or circuit connections for connecting for example with the power supply means, cables or circuit connections between the signaling means 5, when more than one is present, and/or with other additional components present in the signaling sole 1, for example the means for receiving-processing 6 a control signal sc emitted by a portable device.

The at least one seat 30 is positioned in a zone of the sole 1 that is easily accessible or that does not compromise the comfort of the user, who therefore does not sense the presence of the abovementioned components.

Hence, for example, the at least one seat 30 is obtained at an intermediate or rear portion of the sole, in use corresponding to a central zone of the foot or foot arch or heel, in order to interfere as little as possible with the comfort of the foot and with the mechanical bending and/or twisting properties of the sole itself.

In addition, in one version of the invention, the at least one seat 30 is fluidly isolated from the rest of the sole and from its upper surface 2, in a manner such that the user, during the normal use of the sole 1 or of the shoe provided with one such sole, cannot come into contact with the signaling means and/or with the wires or connections present within the sole itself, and hence does not run any risk.

In a further version of the invention, the upper surface 2 of the sole 1 and/or the insole 20, if present, can have at least one openable-recloseable portion 40 at the at least one seat 30, in a manner so as to allow the user to access at least part of the content of the seat 30.

In such version, means can be present that are adapted to ensure the hermetic closure of the at least one openable-recloseable portion 40, in a manner such that possible liquids cannot come into contact with the at least one seat 30 and/or with its content.

Figure 7:
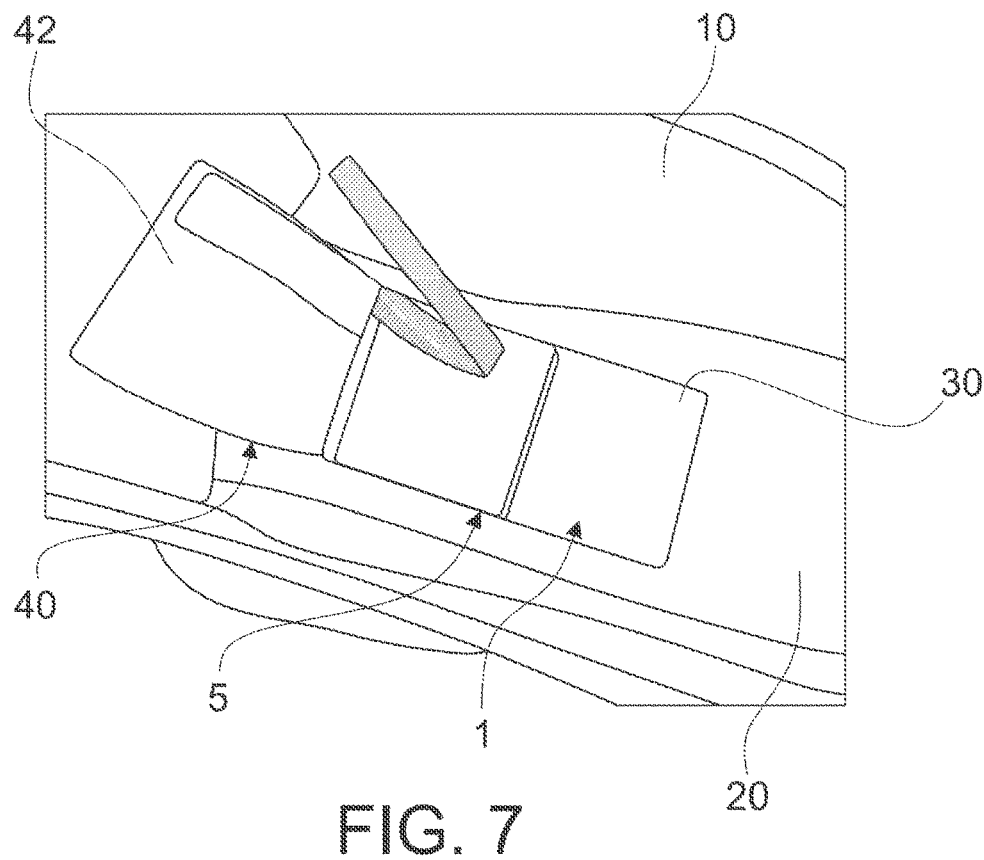
FIG. 7 is a view of the interior of a shoe provided with a sole according to the present invention.
Figure 8:
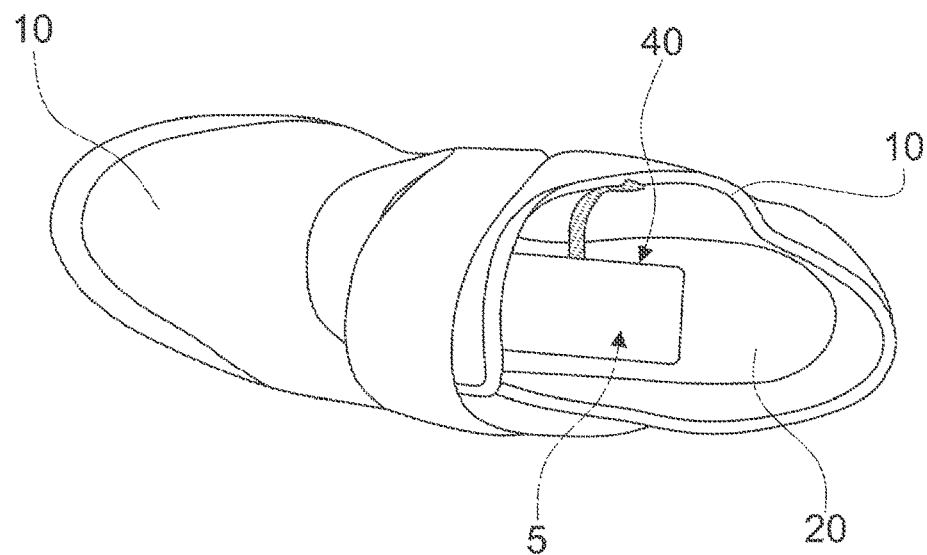
FIG. 8 is a view of the interior according to another version of the shoe of FIG. 7.

In FIGS. 7 and 8, such openable portion 40 is illustrated, in a merely exemplifying manner, by means of a tongue 42, having size roughly corresponding to that of the at least one seat 30. The tongue 42 is adapted to cover the seat 30 and can be lifted-lowered or removed-applied by the user as desired or according to requirements.

A pair of soles 1 as described above can be easily integrated in a control kit according to the present invention.

Figure 9:
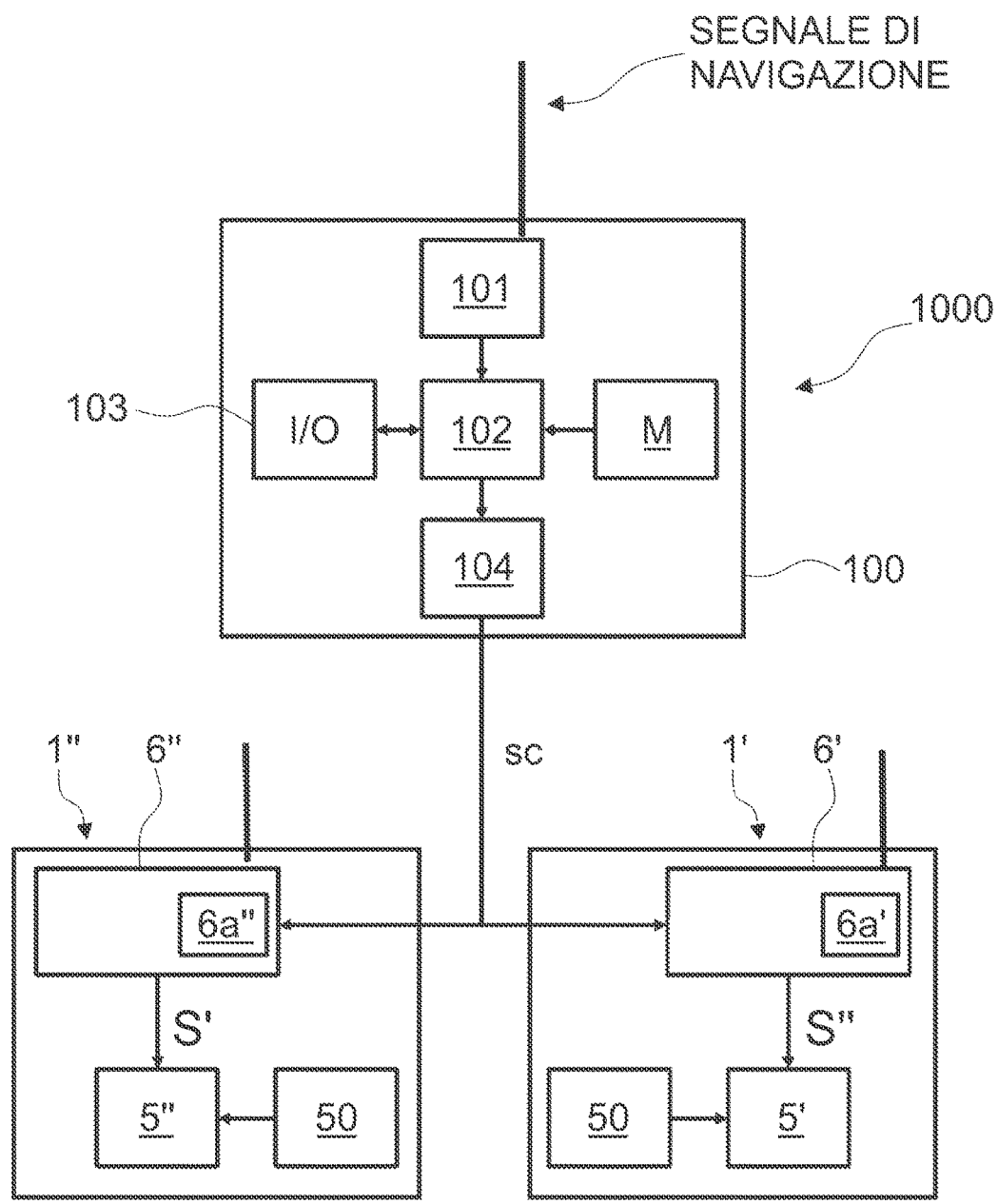
FIG. 9 is a block diagram of the main components of the kit according to the present invention.

With particular reference to FIG. 9, it will be observed that control kit according to the present invention is generally indicated with the reference number 1000 and comprises at least one signaling sole as described above, preferably a pair of soles 1' and 1", as well as a portable device 100 operatively connected to the sole or soles.

More particularly, the device 100 can for example be a cell phone, a smartphone, a tablet, a satellite navigation system, a laptop computer, a smartwatch, an earphone, or any other suitable device, in any case capable of receiving a navigation signal, e.g. a GPS signal, and provided with at least one map M relative to a place of interest for a user.

The device 100 then comprises at least one means 101 for receiving a navigation signal, e.g. GPS, and at least one program control unit 102, operatively connected to the receiver means 101 and set for analyzing the navigation signal or GPS received therefrom.

The portable device 100 also comprises input-output means 103 operatively connected to the program control unit 102, for example comprising an access keyboard and display means, through which a user can send several parameters of interest to the program control unit 102 and display information emitted in output by the control unit 102, as will be better explained herein below.

The portable device 100 also comprises transmission means 104, also operatively connected to the program control unit 102 and intended to receive, from the latter, suitable control signals to be sent, in any suitable manner—e.g. via radio, preferably by means of a Bluetooth signal—to the receiving-processing means 6 of at least one sole 1' or 1".

Returning to the program control unit 102, among other things this governs the control of each sole 1', 1" of the kit according to the present invention in the way that will be explained herein below.

Indeed, a user can set in the program control unit 102, by means of the input-output means 103, a final destination to be reached and the program control unit 102—on the basis of a map M previously loaded therein and on the basis of the navigation signal, e.g. GPS, received by the navigation signal (GPS) receiver means 101—is capable of processing an output control signal sc correlated with a certain direction indication (e.g. for stopping, advancing, moving back, turning right or turning left) which the user will have to follow in order to reach the final destination.

The control signal sc can be transmitted, by means of the transmission means 104 to one or the other or to both soles 1', 1" according to the following modes.

To facilitate comprehension, the case illustrated in FIG. 9 will be discussed, in which the kit comprises a pair of soles 1' and 1" worn by a user, respectively a right and left sole.

For example, if on the basis of the processing carried out by the program control unit 102, the control signal sc is correlated with the direction indication corresponding to a "right turn", the control signal sc will be a signal of activation of at least one signaling means 5' of the right sole. More particularly, the receiving-processing means 6' of the sole 1', once the signal sc emitted in output by the portable device 100 has been received, will process such signal and will in turn emit in output a signal S' for activating/turning on the at least one vibrating motor 5a and/or the at least one light device 5b.

For example, if on the bases of the processing carried out the control signal sc is correlated with the direction indication corresponding to a "left turn", the control signal sc will be a signal of activation of at least one signaling means 5" of the left sole 1". More particularly, the receiving-processing means 6" of the sole 1", once the signal sc emitted in output by the portable device 100 has been received, will process it and will in turn emit in output a signal S" for activating/turning on the at least one vibrating motor 5a and/or the at least one light device 5b of the left sole.

In an analogous manner, if the processing executed by the program control unit 102 provides that the user must move back, hence reverse his/her travel direction, the output signal sc transmitted by the transmission means 104 will be a signal of successive activation of both soles 1' and 1". More particularly, the receiving-processing means 6' of the right sole, once the signal sc has been received, will emit in output a signal S' for activating/turning on the at least one vibrating motor 5a and/or the at least one light device 5b in the right sole 1'. In addition, the receiving-processing means 6" of the left sole, once the signal sc has been received and a certain time period has passed, will emit in out a signal S" for starting the at least one vibrating motor 5a and/or the at least one light device 5b in the left sole 1".

In addition, if the processing executed by the program control unit 102 provides that the user must stop, the output signal sc transmitted by the transmission means 104, correlate with the stop indication, will be a signal of simultaneous activation for both soles 1' and 1". More particularly, each of the receiving-processing means 6' and 6" of both soles 1' and 1", once the signal sc emitted by the portable device 100 has been received, will process in output a corresponding signal S' or S" for activating/turning on the at least one vibrating motor 5a and/or the at least one light device 5b in each sole 1' and 1".

As will be observed, the fact that—in reply to a signal sc deriving for example from a portable device 100—the right sole 1' or the left sole 1" worn by a user can be activated is a considerable technology complication. In particular, the two soles 1', 1" must be constantly connected, they must share the information received and be synchronized. Additional complication is due to the fact that, in reply to a signal sc deriving from a portable device 100, only the right sole or the left sole may be illuminated, in combination with the vibrating motor 5a. For such purpose, the receiving-processing means 6 of a sole according to the present invention, as already briefly mentioned above, comprise processing means, and specifically means 6a for comparing the signal sc received therefrom in order to determine if the received signal sc is intended for the sole where the comparing means are housed or for the other sole of the kit. Clearly, the transmitted signal sc must contain, encoded therein, the information relative to the sole receiving the signal itself or in any case there must be a recognition, of any suitable type, between the signal sc sent by the portable device 100 (received by all the receiving-processing means 6 of each sole of the kit) and the sole that is the recipient of such signal.

The man skilled in the art of the field can easily comprehend that the signals S' and S", for activating at least one signaling means 5 in a sole 1' and 1", will activate such signaling means for a specific time interval or will be followed, after a certain pre-established time, by a corresponding signal S' and S" for deactivating such signaling means 5.

That said, it is easy to understand that a sole 1 according to the present invention, provided not only with at least one vibrating motor 5a but also with at least one light device 5b, as well as a kit 1000 comprising at least one such sole, can be particularly useful in conditions of strong environmental noise or vibration, as for example firemen, soldiers, rescuers, etcetera might experience, in which it is difficult to distinguish the vibrations produced by the sole from the environmental vibrations. The light signal, which signals a specific event by an operator, e.g. the direction to be followed, advantageously allows—in addition to or as an alternative to the vibration emitted by the vibrating motor 5a—overcoming the drawbacks present in such environments, ensuring a clear and safe perception of the signal transmitted by the portable device 100 to the operator.

Optionally, then, if a sole according to the present invention is provided with a light device 5b provided with a light source 5b1 capable of emitting light radiations of different color, the light device 5b can emit a different color in accordance with the signal sent to the sole, e.g. depending on the direction that user must follow. Alternatively, the light signal can vary in intensity and duration, depending on the direction indication to be provided to the user.

In this case, the kit 1000 according to the present invention could also comprise only one sole for shoes.

If the kit 1000 comprises only one sole for shoes provided with at least one vibrating motor 5a, the activation-deactivation signal S sent to the at least one vibrating motor 5a could vary according to pre-established times and modes, in accordance with the direction indication to be provided. By way of an entirely non-limiting example, if the user is provided with an indication to carry out a reversal of travel, the signal S for activating the vibrating motor 5a could be an intermittent signal of pre-established duration.

Returning to the range of colors that can be generated by the light source 5b1 of the light device 5b of the sole, the signal sc transmitted by the transmitter means 104 of the portable device 100 to the receiving-processing means 6 in the sole according to the present invention can also comprise, encoded therein, the information relative to the color that the light source must emit between a range of possible colors. The pre-selected color can be selected by the user by means of the input-output means 103 on the portable device 100, for example, by means of a Color wheel that can be displayed on the display means of the input-output means 103, and a different color can be paired with each sole 1 of the kit. For example, the different colors can be selected in a manner so as to supply the user with a specific message. For example, red color could signify that the operator must stop, green that he/she can continue walking, etc.

By means of the input-output means 103, the user can select, in a manner known to the man skilled in the art, the operation of the signaling means 5 housed in the sole 1. For example, he/she can allow the activation of only the light device 5b and/or only the vibrating motor 5a, in a manner such that the sole according to the present invention, depending on the settings provided by the user, can vibrate and/or be illuminated.

Advantageously, the sole 1 according to the present invention can be used for signaling to a user who wears it the telephone calls and/or messages arriving on the portable device 100, according to the above-described modes. Hence, for example, if the portable device 100—specifically a cell phone or a smartphone or a device capable of being connected to a data transmission line (for example telephone line)—receives a call or a message, the program control unit 102 can generate a suitable control signal sc in output. The control signal sc, received by the receiving-processing means 6 of one or more soles comprised in the kit, will be suitably processed and the receiving-processing means 6 of the sole(s) intended to receive the signal sc will emit in output a suitable signal S for activating the signaling means 5.

Hence, for example, it can be provided that in case of incoming call, the control signal sc is a signal intended for both or only some soles of the kit and for example provides the indication to vibrate one or both soles with the simultaneous generation of light according to a pre-established color.

The control signal sc emitted by the portable device 100 can also be a signal for turning on-off one or more soles of the kit.

From a practical standpoint, the modes for controlling the soles according to the present invention are stored in the program control unit 102, in the form of instructions executable by the portable device 100.

As can be easily understood, with one such configuration of a sole and of a kit comprising one such sole, by means of the activation-deactivation of the signaling means 5, it is possible to provide a user, even a blind person, with information relative to a path to be followed in order to reach a pre-selected final destination or relative to specific events, such as an incoming call or message.

Once the destination is reached, both the signaling soles 1 and possibly the portable device can emit a particular "pattern", for example obtained by means of a particular sequence of vibrating and/or light signals, which indicate to the user, in a manner known to him/her and encoded, that he/she has reached the desired destination.

In one version of the invention, it can be provided that the user is capable, by means of the input-output means 103 of the portable device 100, to set at least the parameters of interest relative to the destination to be reached, to the control of the colors and/or of the vibrations emitted, as well the general settings, which may be personalized in accordance with the user and/or use conditions and/or the signaling settings for the calls or messages arriving in the remote portable device 100.

From the preceding description, it is clear that the signaling sole 1 according to the present invention has a series of advantages for the user, whether this is a blind person or one with reduced sensory or sight capability, or operators like firemen, rescuers, soldiers, etcetera, who operate in difficult environments. In particular, the signaling sole according to the present invention allows the user to orient himself/herself and to follow a pre-established path until a desired destination is reached, even in the absence of the perception—for personal or environmental reasons—of the necessary space time coordinates.

A signaling sole according to the invention allows being notified in a clear manner upon verification of specific events, such as the arrival of a telephone call or message on the portable device 100. The timely signaling of specific events, in particularly critical situations, might make the difference.

The invention thus conceived is susceptible to numerous modifications and variations, all falling within the scope of the inventive concept.

In addition, the characteristics described for one embodiment of the invention can also be present in other embodiments, without departing from the protective scope conferred by the present invention.

In addition, all detail can be substituted by other technically equivalent elements. In practice, the materials used, as well as the contingent shapes and sizes, can be of any type in accordance with requirements without departing from the protective scope of the following claims.

The invention claimed is:

1. A sole for shoes comprising an upper surface, in use facing a user, a lower surface, in use facing a ground, and a thickness, wherein said thickness corresponds to a distance between said upper surface and said lower surface, wherein said sole comprises at least one signaling means, wherein
said at least one signaling means comprises at least one vibrating motor, capable of vibrating inside said sole and at least one light device, wherein said sole comprises means for receiving-processing a control signal (sc) to receive and process said control signal (sc) and to emit in reply an activation-deactivation signal (S) towards said at least one signaling means, wherein said at least one vibrating motor and said at least one light device are activated in response to the activation-deactivation signal (S).

2. The sole according to claim 1, wherein said at least one vibrating motor comprises a motor of the type used for generating a vibration in a mobile phone.

3. The sole according to claim 1, wherein said at least one light device comprises at least one light source of at least one of LED and laser type.

4. The sole according to claim 3, wherein said light device comprises at least one means for propagating a light radiation that can be generated by said at least one light source.

5. The sole according to claim 4, wherein said at least one propagation means of said one light radiation comprises at least one or more optical fibers arranged at at least one of said lower surface of said sole and laterally to said sole, so that, a light radiation transmitted therein is visible from the outside.

6. The sole according to claim 1, wherein said means for receiving-processing said control signal (sc) comprise at least comparing means.

7. The sole according to claim 1, wherein said thickness is variable and comprises a first height (D) and a second height (d), wherein said first height (D) is greater than said second height (d).

8. The sole according to claim 1, further comprising at least one hollow seat designed to contain said at least one signaling means, wherein said at least one seat has a depth, wherein said depth is equal to or lower than said thickness of said sole.

9. The sole according to claim 1, wherein said upper surface of said sole comprises a covering insole, adapted to come into contact with the foot of the user.

10. The sole according to claim 9, wherein at least one of said upper surface of said sole and/or and said covering insole comprise at least one openable portion at an at least one seat.

11. The sole according to claim 10, wherein at least one of said upper surface of said sole and said covering insole comprise means designed to ensure a seal of at least one of said at least one openable portion and of said seat and of said at least one signaling means.

12. The sole according to claim 1, comprising power supply means for said at least one signaling means, said power supply means being removable from said sole or rechargeable by means of input-output means provided therein.

13. A sole comprising the sole according to claim 1.

14. The sole according to claim 13, comprising an upper and said sole, wherein said at least one signaling means is present in at least one of said sole, in said lower surface of said sole and in said upper.

15. The sole according to claim 13, wherein said at least one signaling means is completely inserted in said thickness of said sole.

16. A kit comprising at least one sole according to claim 1, and a portable device operatively connected thereto, for sending the control signal (sc) to said receiving-processing means of said at least one sole.

17. The kit according to claim 16, wherein said portable device comprises:
at least one means for receiving a navigation signal;
at least one program control unit, operatively connected to said means for receiving said navigation signal and in charge of an analysis of said navigation signal;
input-output means operatively connected to said program control unit, through which a user can send some parameters of interest to said program control unit;
transmission means, operatively connected to said program control unit and intended to receive, from the latter, suitable control signals, emitted in response to said analysis of said navigation signal, said suitable control signals being provided to be sent to said receiving-processing means of said at least one sole.

18. The kit according to claim 17, comprising a right sole and a left sole according to claim 1.

19. The kit according to claim 16, wherein said portable device comprises a device to be selected from among a mobile phone, a smartphone, a tablet, a satellite navigation system, a laptop computer, a smartwatch, a earphone, or a device capable of receiving a navigation signal and provided with at least one map M concerning a place of interest for a user.

20. A method for controlling a sole comprised in a kit according to claim 18, wherein, if based on said analysis carried out by said program control unit said control signal (sc) is correlated with a direction indication of "turn right", said control signal (sc) is an activation signal of said at least one signaling means of said right sole such that said receiving-processing means of said sole, once said control signal (sc) is received, emit in output an activation signal (S') of at least one of said at least one vibrating motor and of said at least one light device of said right sole.

21. The method according to claim 20, when said portable device comprises input-output means operatively connected to said program control unit, through which the user can send some parameters of interest to said program control unit, wherein said parameters of interest comprise a final destination, a color of choice that can be selected by means of a Colorwheel displayable on display means of the input-output means, one on-off setting of one or more soles of said kit, one activation-deactivation setting of said at least one signaling means.

22. The method according to claim 20, wherein, when said portable device is a mobile phone or a smartphone or a device capable of connecting to a data transmission line and said remote device receives a call or a message, said program control unit generates, in use, a suitable output control signal (sc) so that said receiving-processing means of one or more soles of said kit, emit in output a suitable activation signal (S', S") of said signaling means.

23. A control method according to a kit according to claim 20, wherein if, based on said analysis carried out by said program control unit, said control signal (sc) is correlated with a direction indication of "turn left", said control signal (sc) is an activation signal of said at least one signaling means of said left sole such that said receiving-processing means of said sole, once said signal (sc) is received, emit in output the signal (S") for activating at least one of said at least one vibrating motor said at least one light device of said left sole.

24. The control method according to claim 23, wherein if said processing carried out by said program control unit provides for the user to make a reversal of travel, said control signal (sc) transmitted by the transmission means is a subsequent activation signal of both said soles such that said receiving-processing means of said right sole emit in output the signal (S') for activating at least one of said at least one vibrating motor and at least one light device of said right sole, wherein said receiving-processing means of said left sole, once a certain preset amount of time has elapsed, emit in output the activation signal (S") for activating at least one of said at least one vibrating motor and said at least one light device of said left sole.

25. The control method according to claim 23, wherein, if said processing carried out by said program control unit provides for the user to stop, said control signal (sc) transmitted by said transmission means is a simultaneous activation signal of said soles such that said receiving-processing means of said soles, once said signal (sc) emitted by the portable device is received, emit in reply the activation signal (S', S") for activating at least one of said at least one vibrating motor and said at least one light device in each sole.

26. The method according to claim 23, wherein said activation signal (S', S") activates said signaling means for a determined time interval or it is followed, after a certain preset time, by a corresponding deactivation signal (S', S") of said signaling means.

27. A sole for shoes comprising:
an upper surface for facing a user;
at least one signaling means, wherein said at least one signaling means comprises at least one vibrating motor and at least one light device,
wherein said sole comprises means for receiving-processing a control signal (sc) to receive and process said control signal (sc) and to output an activation-deactivation signal (S) to said at least one signaling means, wherein said at least one vibrating motor and said at least one light device are activated in response to the activation-deactivation signal (S) to indicate a direction the user must follow.

* * * * *